United States Patent [19]

Jung

[11] Patent Number: 5,007,293
[45] Date of Patent: Apr. 16, 1991

[54] TWO-PHASE FLOW METER

[76] Inventor: Douglas B. Jung, 3209 Franz Valley Rd., Santa Rosa, Calif. 95404

[21] Appl. No.: 285,735

[22] Filed: Dec. 16, 1988

[51] Int. Cl.⁵ ........................ G01F 1/74; G01F 15/08
[52] U.S. Cl. .................................... 73/861.04; 73/200
[58] Field of Search ............... 73/861.04, 200, 861.69, 73/861.52

[56] References Cited

U.S. PATENT DOCUMENTS

| | | | |
|---|---|---|---|
| 3,086,395 | 9/1963 | York | 73/861.52 |
| 4,144,754 | 3/1979 | Pitt, Jr. et al. | 73/861.04 X |
| 4,178,801 | 12/1979 | Cassell, Jr. | 73/200 |
| 4,282,760 | 8/1981 | Pitts, Jr. et al. | 73/861.04 X |
| 4,312,234 | 1/1982 | Rhodes et al. | 73/861.04 |
| 4,574,643 | 3/1986 | Scott et al. | 73/200 |
| 4,817,439 | 4/1989 | Arnaudeau et al. | 73/200 X |

Primary Examiner—Herbert Goldstein
Attorney, Agent, or Firm—Larry D. Johnson

[57] ABSTRACT

A device for metering a liquid and a vapor flowing through a conduit generates a spin to the two-phase flow, by which the centrifugal force separates the liquid phase from the vapor phase. Next, the liquid-vapor rate and the isolated annular vapor rate are measured. These measurements can then be mathematically solved for the individual flowing components. The vapor and liquid re-mix downstream of the apparatus.

11 Claims, 2 Drawing Sheets

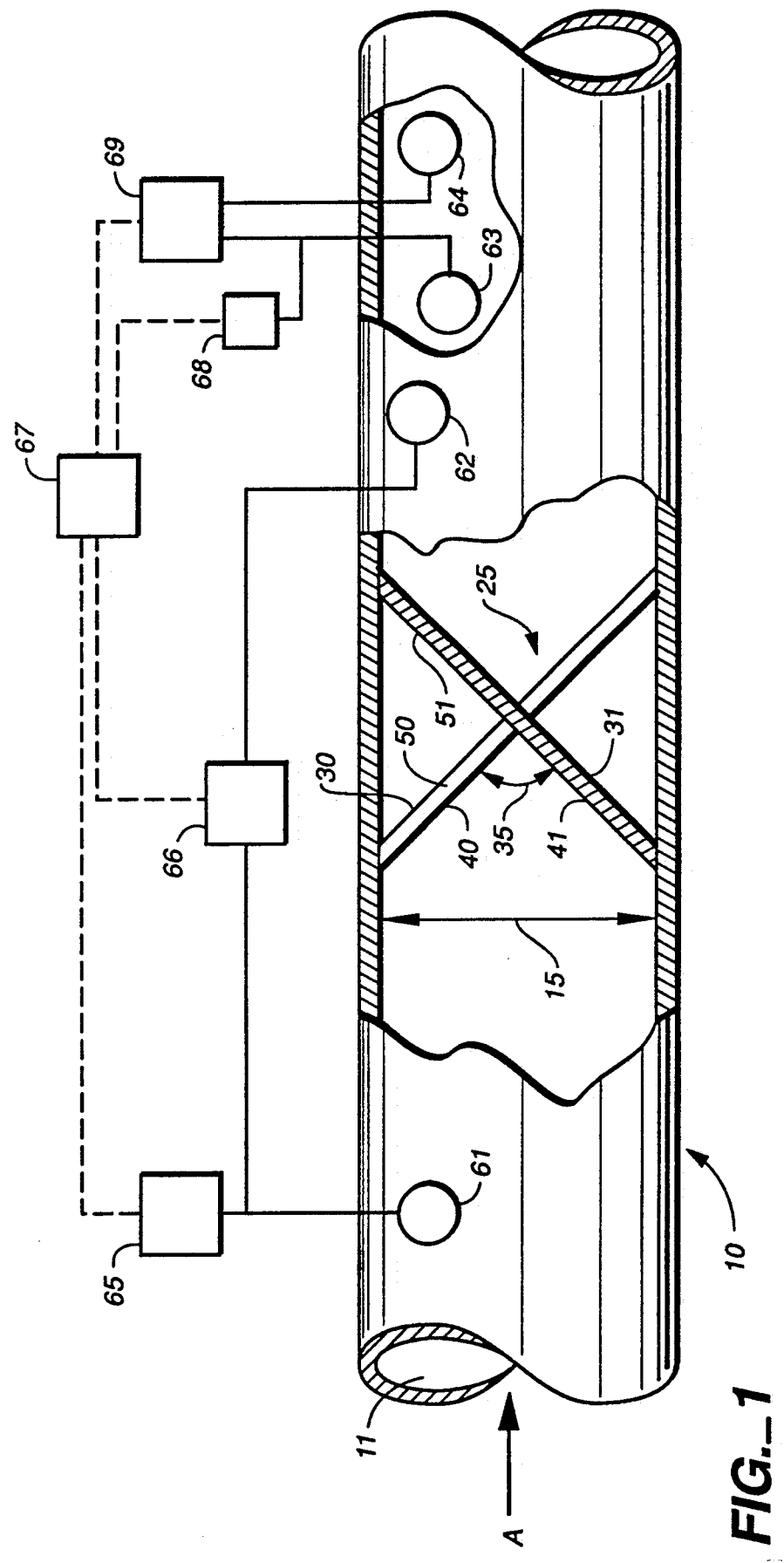
FIG._1

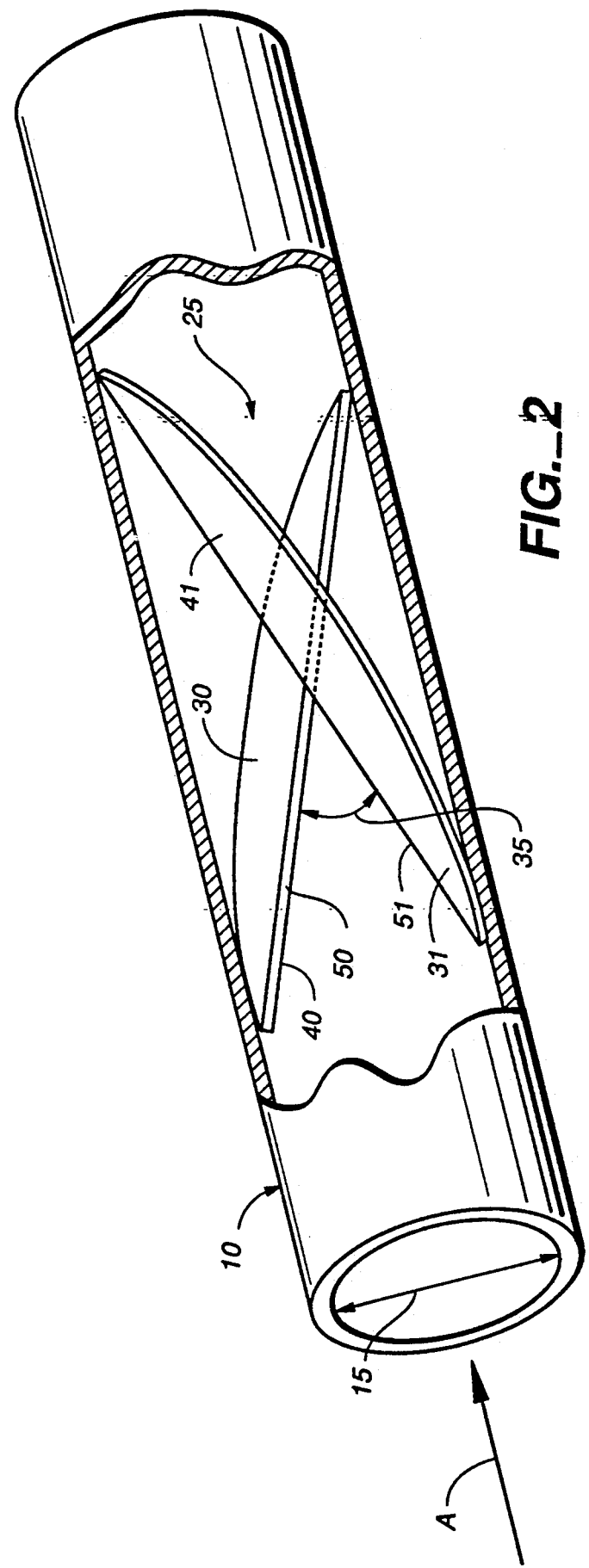
FIG._2

TWO-PHASE FLOW METER

BACKGROUND OF THE INVENTION

1. Field of the Invention

This invention relates generally to measurement devices, and more specifically to an improved flow meter device for measurement of a two-phase flow mixture.

2. Description of the Prior Art

The present invention relates to devices for the measurement of a two-phase flow mixture such, as a liquid and a gas, flowing within a conduit. Such devices are highly beneficial in the measurement of geothermal fluids (where the two phases comprise steam and brine), wet steam, oil and gas, as well as other mixtures containing two or more components. The measurement of two-phase flow is highly desirable or even necessary in the production or processing of fluids. As an example, in the production of geothermal fluids, oil and gas, or the generation and distribution of wet steam used in the stimulation of oil wells, the fluids are either produced from the ground in multiphase components or they are injected into the ground as such. It is highly desirable to know how much of each individual phase component is produced or injected for the management of the production facilities and the underground reservoir.

Unfortunately, the use of conventional single phase measurement techniques encounter problems of separation of phases, pulsation, scaling, plugging, vibration, erosion, unknown density and other conditions which make accurate measurement impossible. Prior art two-phase flow meters all have inherent weaknesses which render these devices very limited in range, accuracy, reliability and/or cost prohibitive. So unsuccessful have been these prior art devices that none have obtained wide-range commercial success. Presently, the measurement of two-phase flow requires the complexity and expense of processing the flow through a large pressure vessel. This large vessel induces the liquid and the vapor to separate into individual components. Each of the individual components can then be measured and tabulated as a subtotal. The cost to install a single metering facility on a geothermal well is approximately $150,000.

Prior art patents such as those to Engdahl (U.S. Pat. No. 2,439,723), Nguyen (4,576,043) and Scott (4,574,643) utilize an orifice. These devices have a restricted operating range. The beta ratio (orifice bore/pipe inside diameter) must be sized to produce a sufficiently strong differential signal. This creates a high pressure loss. Unfortunately, even with judicious sizing, orifices used in two-phase flow encounter noise, pulsation and turbulence interference. The patent to Kuijper (U.S. Pat. No. 4,300,399) teaches an elbow meter used in conjunction with a signal conditioning RMS technique. It requires a high velocity and is limited in range and accuracy. The patent to Huang (4,576,036) utilizes a sampling probe. Representative two-phase sampling is exceedingly complex and is beyond the scope of the present invention. The patent to Jung (4,654,061, and the applicant herein) teaches a device that is not a flow meter but is a geothermal separator. It shows an example of a spin generating element. Cain (4,320,665) shows an ultrasonic device. Pitt (4,144,754) utilizes a gamma ray density meter installed within a loop. Cassell (4,178,801) shows a device that is a separator mounted on top of a power plant boiler. A pressure drop is taken across the full length of the separator and used in conjunction with a steam only measurement taken across a restricted outlet. The liquid is drained back into the boiler.

The patent to Scott (U.S. Pat. No. 4,574,643) teaches a device that is an orifice followed by a helical coil with a shielded pitot-static tube inserted between the ribs of the coil and into the radius. This device is unlike the present invention for the following reasons: Scott utilizes an orifice, while the present invention does not. Scott utilizes a helical coil, while the present invention does not. Scott induces a rotational motion of the total flow, through viscous shear of a vapor, by means of a helical coil. A portion of the flow will be guided by the protuberance of the coil. The centrifugal force generated is weak and dictates a long device. The present invention generates a strong spinning fluid through a direct change in flow direction. Scott does not generate but induces a rotational motion. Scott's device must insert a shielded pitot-static tube within the rotation inducing element. The present invention can be inserted ten or more diameters downstream of the spin generating element. Scott measures a annular vapor flow rate through a partially blocked conduit. The present invention measures an annular vapor rate through a full bore. The Scott device is a long device encompassing approximately seventy-three pipe diameters. The present invention can be less than seven pipe diameters. Finally, the Scott device can encounter a poor signal to noise ratio, acts as a spray nozzle generating small particles which can escape the centrifugal force of the coil, is susceptible to scaling, crevise corrosion, and harmonic failure, is limited to small pipe diameters and must be operated within a restricted range.

SUMMARY OF THE INVENTION

The two-phase flow meter of this invention provides a simple, compact, rugged, and easy to manufacture flow meter for measurement of a two-phase flow mixture. In operation, a two-phase mixture of a vapor and a liquid flows through a pipe or conduit. The flow enters a spin generating element. The spin generating element causes a directional change in the flow vector which in effect causes the mixture to spin down the pipeline. The spin flings and holds the heavier liquid fraction against the pipe wall and allows only the vapor to flow through the annulus. With the mixture separated, an annular vapor measurement can be taken. This measurement will give a first order approximation of the vapor fraction. A second measurement is taken across the spin generating element as either a frictional or preferably an accelerational pressure differential signal. Optionally, a liquid thickness gauge can measure the boundary layer downstream of or within the spin generating element, or a centrifugal force can be measured. With these two or more measurements, computational techniques can resolve the mixture into individual (vapor/liquid) components.

The preferred spin generating element in the present device is comprised of two semi-elliptical blades or plates. The plates are diagonally positioned within the pipe such that an angle is formed between them. As the vapor stream travels across the plates, it is split into two helical flow patterns creating a rotational movement in the flow stream. The rotational movement in the flow stream generates an outward force, believed to be a centrifugal force, which causes the liquid and entrained solids to be forced outward against and onto the inner surface of the pipe. The lower density vapor or gas will flow through the annulus. The spin generating element may be of any configuration or arrangement so long as a rotational or swirling movement is developed within the conduit to cause a separation of phases.

Measurements are taken upstream and across the spin generating element as preferably a static pressure (upstream) and a differential pressure. The upstream pressure can define the vapor density and the differential pressure signal when used in conjunction with an annular vapor rate, and the upstream pressure will define the fluid/vapor ratio. Temperature measurements may also be utilized. Other optional techniques can be used to resolve the flow equations. A centrifugal force can be measured downstream of or within the spin element or a liquid thickness gauge or density meter can be used to meter the liquid fraction. These measurements can be used in conjunction with the annular vapor measurement.

Downstream of or within the spin element the liquid and vapor phases are separated. The liquid is spiraling against the pipe wall and the vapor is spinning through the annulus surrounded by the liquid fraction and contained by the pipe. As such, a vapor measurement can be taken in the annular liquid free region. The instrument can be a number of devices such as: a pitot-static tube, averaging pitot tube, turbine, vortex, etc. Since the conduit is partially filled with a liquid, the annular vapor measurement does not represent an absolute quantity but like the spin generating element performs a pseudo measurement. The combination of these measurements resolves the liquid and vapor into individual components.

The novel features of this invention that produce new and unexpected results are as follows:

a. The device does not utilize an orifice plate.

b. The device utilizes the spin generating element also for a pseudo flow meter.

c. The device does not induce through viscous shear but creates through a directional change in flow, a strong rotational movement in the flow stream. The centrifugal force generated by the device is a multitude stronger and more efficient vapor/liquid isolator than the prior art devices.

d. The spin generating element replaces the orifice and the helical coil found in the prior art.

e. The annular vapor flow meter can but does not require placement within the spin inducer.

f. The device unlike the prior art does not have a liquid holdup problem. This is to say that any liquid flowing along the bottom of the pipe freely passes through the device. It drains freely. Other devices, such as orifices, can dam up in front of the plate and periodically release a surge of liquid causing signal fluctuations. The smaller the differential signal or the larger the pipe size, the worse the signal to noise ratio.

g. The annular vapor meter measures in a full open conduit. It is not partially blocked by a nozzle or a helical coil as in the prior art.

h. The device does not require a double shell to isolate and drain the separated liquid, nor require mounting in a vertical position on top of a power plant boiler.

i. The dual purpose, high efficiency design allows for a short and compact device. This is accomplished by eliminating the orifice plate and the helical coil found in the prior art devices. The length can be reduced from approximately seventy-three to less than seven pipe diameters if desired.

j. The device unlike the prior art is not limited to small conduit diameters or a narrow operating range. Unlike the helical coil which induces a weak centrifugal force, that decreases in strength with an increase in diameter, the present device directly creates a strong centrifugal force.

k. The device is corrosion, scale and plug resistant. It does not create a spray nozzle effect (orifice plate) nor provide crevices (helical coil) for corrosion or scaling to occur.

l. The measurement across or within the spin element is preferably an accelerational differential pressure. However, temperature, frictional, centrifugal, or a liquid boundary layer can be measured and used for calculating two-phase flow.

BRIEF DESCRIPTION OF THE DRAWINGS

FIG. 1 is a partially cutaway side elevational view of a two-phase flow meter of this invention as installed in a section of conduit; and FIG. 2 is a partially cutaway perspective view of a section of conduit, illustrating a spin generating element used to create the swirling motion in the vapor stream in accordance with the preferred embodiment of this invention.

DETAILED DESCRIPTION OF A PREFERRED EMBODIMENT

FIG. 1 is a partially cutaway side elevational view of the two-phase flow meter of this invention as installed in a section of pipe or conduit. The pipe 10 has an inner surface 11 and an inside diameter 15, and defines a circular passage through which the liquid and vapor flows, in the direction as indicated by arrow A. The spin generating element 25 comprises two blades 30, 31 which are preferably of a semi-elliptical shape. The blades 30, 31 include two planar surfaces 40, 41 and generally straight edges 50, 51, between said surfaces 40 and 41. Surfaces 40, 41 of each blade are the surfaces that the flow stream impinges upon as it flows through the pipe 10 in direction A. These blades 30, 31 are preferably diagonally positioned within pipe 10, such that an angle 35, as best seen in FIG. 1, is formed between edges 50, 51 of each blade. Angle 35, which will be somewhat dependent on the length of the blades 30, 31, as measured by the length of edges 50, 51, should be from about forty degrees to about ninety degrees, and preferably about sixty degrees. The overall length of each blade will be dependent upon the diameter of the pipe being used, but will generally range from about two tenths to about five feet. Blades 30, 31 may be secured to inner surface 11 of pipe 10 by any suitable means, such as by welding.

As a flowing two-phase mixture within the conduit 10 enters the spin generating element 25, a directional change is imparted which causes the mixture to continue swirling downstream of blades 30, 31. The swirling motion creates a force which causes the mixture to separate. The denser liquid fraction is thrown to inner pipe surface 11 and swirl ten to one hundred diameters or more down the pipe 10 until the spin energy dissipates and the fluids re-mix.

Within the conduit 10, are installed sensors used to transmit the flow data for computation. Installed in pipe 10, upstream of the spin generating element 25 is a static pressure sensor 61, which is used to determine the vapor density state. The sensor is connected to pressure transmitter 65 and to one side of differential pressure transmitter 66. The flow through the spin generating element 25 creates a pressure differential. Pressure sensor 62 is installed within or downstream of the spin generating element 25, within conduit 10. This pressure sensor 62 is connected to differential transmitter 66. Pressure sensors 61 and 62 produce a differential signal indicative of the flow across the spin generating element 25. Pressure transmitter 65 and differential transmitter 66 are connected to microprocessor 67. The location of the static pressure sensor 61 on pipe 10 is variable but is generally one diameter upstream of the spin generating element 25. Pressure sensor 62 placement is also variable and is generally located from center line of the spin generating element 25 to one diameter downstream. Its radial location can be from the pipe inside surface 11 to the full radius into the conduit. A typical insertion radius is two-thirds into the conduit radius.

Downstream of the spin generating element 25 the liquid fraction is flowing along the inside pipe surface 11 with the liquid free vapor flowing within the annulus. A pitot-static tube is installed within pipe 10 to measure an annular vapor rate. Dynamic pressure sensor 63 is connected to pressure transmitter 68 and to one side of differential pressure transmitter 69. Static pressure sensor 64 is connected to differential pressure transmitter 69. Pressure sensors 63 and 64 produce a differential signal indicative of the pseudo vapor flow rate. Pressure transmitter 68 and differential pressure transmitter 69 are connected to microprocessor 67.

The location of the pitot-static tube composing of pressure sensors 63 and 64 can be from within the spin generating element one to ten or more diameters downstream from the spin generating element 25. A typical placement will be five diameters downstream of the spin generating element 25. Its insertion distance into the radius will vary from one-third to one, with a typical two-thirds location.

In the measurement of two-phase flow additional parameters such as temperature may be required. In geothermal fluids, where two or more components are in the fluid, non-condensable gas and brine chemistry measurements may be desirable.

Data from pressure and differential pressure transmitters 65, 66, 68, and 69 can be sent to microprocessor 67 for computation. Programmed into the computer are basic equations, tables, and coefficients developed during calibration testing specific to the applied meter.

Notwithstanding the above description of the preferred embodiment of the meter shown, it is to be understood many alternative forms of spin generating devices can be utilized to create a separation of phases; as well as techniques to measure signals across the spin genera-tion device and to measure the liquid free annular vapor region downstream.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A flow meter for measurement of a two-phase liquid and vapor mixture flowing within a conduit, said conduit having an inside surface, said flow meter comprising:

spin generating element means for generating a spin to said two-phase mixture flowing within said conduit, said spin generating means comprising a pair of blades presenting opposing planar surfaces to said flowing two-phase mixture, said spin generating element means conditioned to separate said liquid and said vapor and to urge said liquid to flow against said inside surface of said conduit in the form of an annulus, and to urge said vapor to flow through said annulus;

first measurement means for measurement of the liquid-vapor rate, and second measurement means for measurement of the annular vapor rate.

2. The flow meter of claim 1 wherein said blades are semi-eliptical in shape.

3. The flow meter of claim 1 wherein said planar surfaces form an angle between forty and ninety degrees.

4. The flow meter of claim 1 wherein said planar surfaces form an angle of sixty degrees.

5. The flow meter of claim 1 wherein said first measurement means comprises mean for measuring a differential signal across said spin generating element means.

6. The flow meter of claim 5 wherein said means for measuring a differential signal comprises means for measuring frictional pressure differential.

7. The flow meter of claim 1 wherein said first measurement means comprises a liquid thickness gauge.

8. The flow meter of claim 1 wherein said second measurement means comprises a pitot-static tube.

9. The flow meter of claim 1 wherein said second measurement means comprises an averaging pitot tube.

10. The flow meter of claim 1 wherein said second measurement means comprises a turbine.

11. The flow meter of claim 1 including microprocessor means for computing the liquid and vapor components of the two-phase mixture.

* * * * *